No. 858,109. PATENTED JUNE 25, 1907.
W. C. SCHWARZ.
HYDRAULIC TRANSMISSION DEVICE.
APPLICATION FILED MAY 29, 1906.
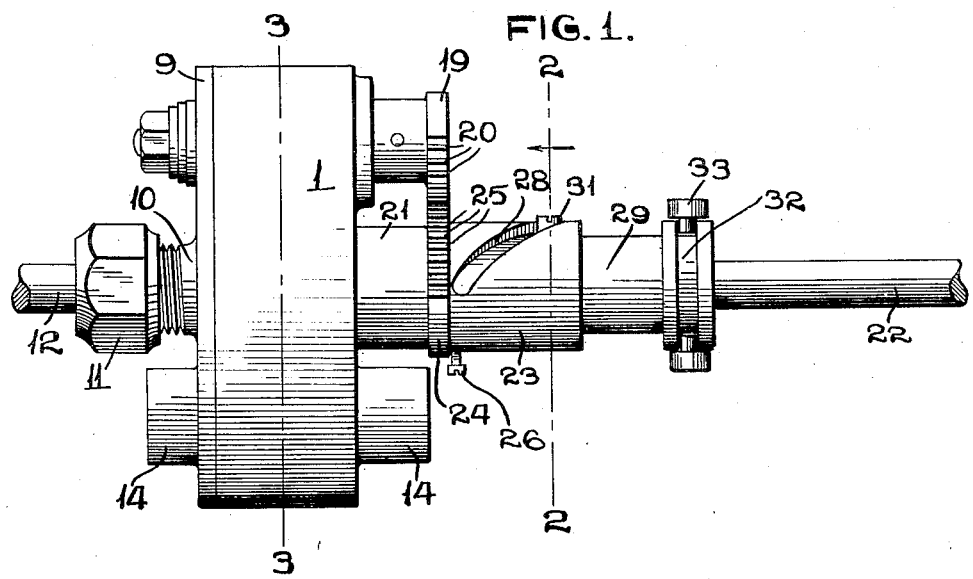
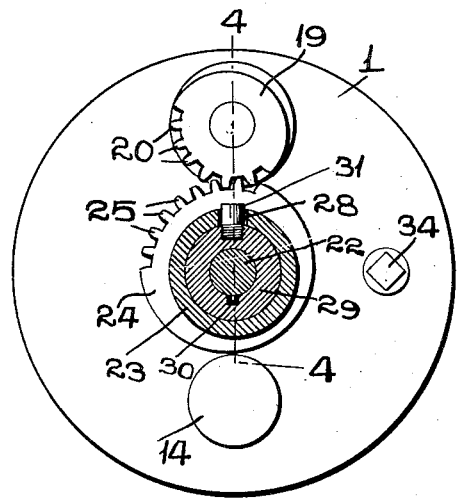
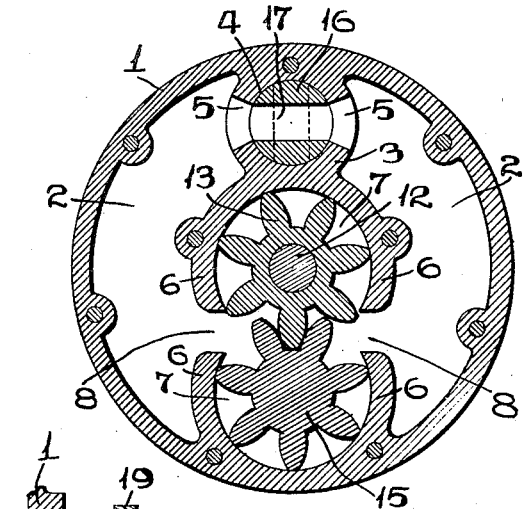
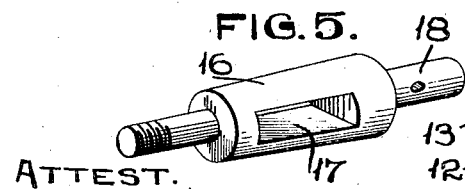
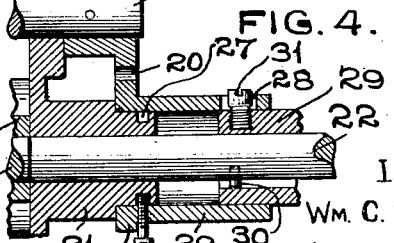
ATTEST.
H. J. Fletcher.
W. P. Smith.
INVENTOR
WM. C. SCHWARZ.
BY Higdon & Longan.
ATTY'S.

UNITED STATES PATENT OFFICE.

WILLIAM C. SCHWARZ, OF EDWARDSVILLE, ILLINOIS.

HYDRAULIC TRANSMISSION DEVICE.

No. 858,109.  Specification of Letters Patent.  Patented June 25, 1907.

Application filed May 29, 1906. Serial No. 319,357.

*To all whom it may concern:*

Be it known that I, WILLIAM C. SCHWARZ, a citizen of the United States, and a resident of Edwardsville, Madison county, Illinois, have invented certain new and useful Improvements in Hydraulic Transmission Devices, of which the following is a specification containing a full, clear, and exact description, reference being had to the accompanying drawings, forming a part hereof.

My invention relates to a hydraulic transmission device, and the object of my invention is to construct a simple, inexpensive device, comprising a minimum number of parts, which may be utilized for transmitting rotary motion from one shaft to another, as, for instance, from an engine shaft to a driven shaft; and which device may be readily and accurately adjusted so as to vary the speed of the transmitted rotary motion.

A further object of my invention is to construct a device for transmitting rotary motion, wherein the friction and the gear wheels, such as are usually employed in devices of this class, are entirely dispensed with, thereby greatly reducing the size and cost of a transmission device.

My invention consists in a drum, in which one end of the driven shaft is mounted, and which drum is divided into two compartments, each filled with a suitable fluid, there being a pair of meshing pinions arranged on the interior of the drum, one of which is fixed on the engine shaft; and which pinions carry the fluid from one compartment to another, and a valve located between the compartments for controlling the circulation of fluid.

My invention further consists in certain novel features of construction and arrangement of parts, which will be hereinafter more fully set forth, pointed out in the claims, and illustrated in the accompanying drawings, in which:—

Figure 1 is a side elevation of a transmission device of my improved construction; Fig. 2 is a vertical section taken on the line 2—2 of Fig 1; Fig. 3 is a vertical section taken on the line 3—3 of Fig. 1; Fig. 4 is a detail section taken on the line 4—4 of Fig. 2; Fig. 5 is a perspective view of the valve I make use of in my improved transmission device.

Referring by numerals to the accompanying drawings:—1 designates a drum in which is formed two oppositely arranged compartments 2. Formed between these compartments by a suitable web, or wall, 3, is a circular valve chamber 4, and ports 5 are formed through the web 3, thus establishing communication between the chambers 2 and the chamber 4. Formed between the chambers 2, below the valve chamber, and surrounded by the semicircular walls 6, is a pair of circular chambers 7, and ports 8 are formed through the walls 6 on opposite sides thereof, in order to establish communication between the chambers 2 and 7. One of the chambers 7 is arranged at the center of the drum 1, and the opposite chamber 7 is located to one side of said drum, and directly opposite the valve chamber 4.

One of the sides of the drum is closed by a removable plate 9, in the center of which is formed a bearing 10, provided with a suitable gland, or stuffing box 11, and in said bearing is arranged for rotation the engine or motor shaft 12. The end of this shaft terminates immediately against the rear wall of the drum 1, and fixed on said shaft, within the chamber 7 that is formed in the center of the drum is a pinion 13. The teeth of this pinion are of considerable depth, and the outer ends thereof fit snugly against the interior of the wall 6 surrounding the central chamber 7.

Formed on the plate 9, and on the outer face of the rear wall of the drum 1 are bearings 14, which are in alinement with the center of the lower one of the chambers 7, and arranged for rotation in said bearings 14 are the trunnions of a pinion 15, which is of the same size and meshes with the pinion 13. The outer ends of the teeth of this pinion 15 bear against the inner face of the wall 6 surrounding this lower chamber 7.

Arranged for operation in the valve chamber 4 is a cylindrical valve 16, through which is formed an opening 17, and which opening is adapted to coincide with the ports 5 in the wall, or web, 3. The stem 18 of this valve extends through the rear wall of the drum 1, and rigidly fixed thereon is a disk 19, in the periphery of which is formed a series of teeth 20.

A hub 21 is formed integral with the outer face of the rear wall of the drum 1, and rigidly fixed in said hub, and in direct alinement with the shaft 12, is a shaft 22. Arranged for rotation on the outer end of the hub 21 is a sleeve 23, on the inner end of which is formed a flange 24, and there being teeth 25 formed in the periphery of said flange, which teeth mesh with the teeth 20 on the disk 19. A retaining screw 26 passes through the sleeve 23, and enters an annular groove 27 formed in the outer portion of the hub 21. Formed in the sleeve 23 is a spirally disposed slot 28, which extends around said sleeve approximately one-quarter of its circumference. Arranged to slide on the shaft 22, and within the sleeve 23, is a collar 29, there being a longitudinally extending groove on the interior thereof, and extending into said groove is a pin 30, which is rigidly seated in the shaft 22. Thus, said collar 29 is arranged to rotate with and slide longitudinally upon the shaft 22. Seated in the inner end of the collar 29 is a pin, or screw, 31, which extends through the spirally arranged slot 28. Formed in the outer end of the collar 29 is a groove 32, in which is arranged the fingers of a yoke 33, which is pivoted in such a manner as that when manipulated, it will move the collar 29 longitudinally upon the shaft, and into or out of the sleeve 23.

The entire space within the drum 1, comprising the compartments 2 and 7, is filled with a suitable heavy liquid, such as lubricating oil, or glycerin, and which liquid is introduced into the drum through a suitably located aperture, closed by a screw plug such as 34.

The operation of the transmission device is as follows: The engine or motor shaft being rotated will necessarily drive the pinion 13 in the center of the drum 1, and said pinion will impart rotary motion to the pinion 15, with which it meshes. Following this rotation of the pinions, the liquid in one of the compartments 2 will be drawn into the compartments 7 through one of the ports 8, and discharged through the opposite port 8 into the opposite compartment 2, and said liquid will pass from thence through the open valve 16 back to the first compartment 2, and thus a continuous circulation of the liquid is maintained as long as the valve is open. As long as said valve remains open to allow the free circulation of the liquid from one compartment 2 to the other, the pinion 13 will continue to rotate in the center of the drum 1, and said drum and parts carried thereby will remain stationary, and no rotary motion will be transmitted from the shaft 12 to the shaft 22. When it is desired to rotate the shaft 22, the operator manipulates the yoke 33 so as to move the collar 29 into the sleeve 23, and, as a result, said sleeve will be rotated one-quarter of a turn, owing to the arrangement of the screw 31 in the spiral slot 28. This action rotates the flange 24 approximately one-quarter of a turn, thus rotating the disk 19 one-quarter of a turn, and thus closing the valve 16, or so rotating the same as that the opening 17 is out of alinement with the ports 5. This action shuts off the circulation of the liquid from one compartment 2 to the other, and, as a result, the pinion 13 can no longer drive the pinion 15, and said pinion which is carried by the drum 1 will thus be locked to said pinion 13, and the drum and parts carried thereby will necessarily rotate with the shaft 12, thus imparting the rotary motion thereof to the shaft 22.

The valve 16 can be so rotated by its operating mechanism as to allow but a very slight circulation of liquid through the opening in said valve, and this adjustment will cause the shaft 22 to rotate at a slightly slower speed than does the shaft 12. The valve can be thus adjusted so as to very accurately regulate the speed transmitted to the shaft 22, which adjustment and regulation may take place while the device is in operation.

A hydraulic transmission device of my improved construction is applicable for use wherever it is desired to transmit rotary motion, comprises a minimum number of parts, can be easily taken apart for repair, and does away with a great deal of gearing and friction wheels usually employed in transmission devices.

I claim:

In a hydraulic transmission device, the combination with a pair of alined shafts, of a drum rigidly fixed on the end of one of the shafts, in which drum is formed a pair of oppositely arranged chambers, a pair of meshing pinions arranged for operation within the drum between the chambers therein, one of which pinions is fixed on the shaft opposite the shaft to which the drum is fixed, a rotary valve arranged between the two chambers within the drum, a toothed segment fixed on one end of the valve outside the drum, a hub integral with the drum, a toothed segment arranged for rotation on said hub, a sleeve integral with said second segment, in which sleeve is formed a spirally arranged slot, a collar arranged to rotate with and slide upon one of the shafts within the sleeve, a pin seated in the collar and extending through the spirally arranged slot, there being a groove formed in the outer end of the collar, and a hook engaging in said groove for imparting movement to said collar.

In testimony whereof, I have signed my name to this specification, in presence of two subscribing witnesses.

WILLIAM C. SCHWARZ.

Witnesses:
EDWARD E. LONGAN,
M. P. SMITH.